(12) United States Patent
Rathweg

(10) Patent No.: US 6,914,748 B2
(45) Date of Patent: Jul. 5, 2005

(54) HEAD SHIELD FOR A TAPE DRIVE

(75) Inventor: Christopher Rathweg, Louisville, CO (US)

(73) Assignee: Quantum Corporation, San Jose, CA (US)

( * ) Notice: Subject to any disclaimer, the term of this patent is extended or adjusted under 35 U.S.C. 154(b) by 382 days.

(21) Appl. No.: 10/165,253

(22) Filed: Jun. 5, 2002

(65) Prior Publication Data

US 2003/0227715 A1 Dec. 11, 2003

(51) Int. Cl.$^7$ ................................................. G11B 5/41
(52) U.S. Cl. ...................................................... 360/128
(58) Field of Search ................................ 360/128, 137, 360/93

(56) References Cited

U.S. PATENT DOCUMENTS

| | | | |
|---|---|---|---|
| 2,905,767 A | * 9/1959 | Eckert, Jr. et al. ........... | 360/128 |
| 3,731,289 A | * 5/1973 | Bajgert et al. .............. | 360/128 |
| 4,010,514 A | * 3/1977 | Fischer et al. ............. | 15/309.1 |
| 4,412,263 A | * 10/1983 | Nelson et al. .............. | 360/128 |
| 4,556,890 A | * 12/1985 | Hermanson et al. ....... | 346/74.4 |
| 5,930,089 A | 7/1999 | Anderson | |
| 6,067,212 A | 5/2000 | Poorman | |
| 6,157,516 A | 12/2000 | Hertrich et al. | |
| 6,166,881 A | 12/2000 | Anderson et al. | |
| 6,215,618 B1 | 4/2001 | Anderson et al. | |

* cited by examiner

*Primary Examiner*—Angel Castro
(74) *Attorney, Agent, or Firm*—James P. Broder; Steven G. Roeder

(57) ABSTRACT

A shield assembly (48) for a tape head (34) of a tape drive (14) includes a head shield (60) that selectively moves between a first position (75A) wherein the tape head (34) is substantially exposed, and a second position (75B) wherein the tape head (34) is substantially shielded. In the first position (75A), a shield aperture (124) exposes the tape head (34) to a storage tape (26). The shield assembly (48) can include a first shield mover (62) that biases the head shield (60) to the first position (75A), and a second shield mover (64) that selectively overcomes the bias of the first shield mover (62) to move the head shield (60) to the second position (75B). The head shield (60) is positioned across the tape head (34) at a shield wrap angle $\theta_2$ that is greater than a tape wrap angle $\theta_1$ of the storage tape (26). A surface of the head shield (60) can include a cleaning region (120) that includes a head cleaning material. Movement of the head shield (60) between the first position (75A) and the second position (75B) can cause contact between the cleaning region (120) and the tape head (34), resulting in cleaning of the tape head (34).

38 Claims, 4 Drawing Sheets

HEAD SHIELD FOR A TAPE DRIVE

FIELD OF THE INVENTION

The present invention relates generally to tape drives which use a removable cartridge having a storage tape. More specifically, the present invention relates to a shield assembly for a tape head.

BACKGROUND

Tape drives are widely used for storing information in digital form. These tape drives commonly use a storage tape having a thin film of magnetic material which receives the information. Typically, the storage tape is guided with a plurality of tape guides between a pair of spaced apart reels, past a data transducer, also referred to herein as a tape head. The tape head records information onto the moving storage tape and/or reads information from the moving storage tape.

In one type of tape drive, one of the reels is part of the tape drive, while the other reel is part of a removable cartridge. For this type of tape drive, the reel that is a part of the tape drive is commonly referred to as a take-up reel, while the reel that is a part of the cartridge is commonly referred to as a cartridge reel. Typically, a cartridge leader on one end of the storage tape is automatically coupled to a drive leader that is connected to the take-up reel during insertion of the cartridge into the tape drive.

The cartridge leader and the drive leader are typically formed from materials that are more robust than the storage tape. Further, in one type of tape drive, a buckle formed from rigid materials such as metal or plastic is secured to the cartridge leader. The buckle engages the drive leader upon insertion of the cartridge into the tape drive. The procedure of connecting the drive leader to the cartridge leader is commonly referred to as buckling. Subsequently, during ejection of the cartridge, the cartridge leader is unbuckled from the drive leader.

During buckling and unbuckling, the buckle, the drive leader and/or the cartridge leader pass in close proximity and can actually contact the tape head. This contact can cause excessive or premature wear to the tape head, or can permanently damage the tape head.

Additionally, electrostatic discharge (ESD) is a major concern in the use of tape heads in tape drives. This is particularly true in the case of magneto-resistive (MR) heads, which are generally used in modern high-density tape technology. In some tape drives, the drive leader and/or the cartridge leader build up static charge from moving friction, thereby creating electrostatic discharge problems that can irreparably damage the tape head when the leaders come in contact with the tape head.

Moreover, high contact pressures are generated during movement of the storage tape over the tape head, stripping any surface contamination and weakly attached particles from the tape. These contaminants accumulate on the tape head, causing spacing loss between the tape head and the tape. Spacing loss can result from slots within the tape head being filled with debris, which can render the slots less effective. Spacing loss can also result from piles of debris accumulating over the tape head, which physically causes the tape to lift off the tape head, thereby resulting in reading and/or writing errors. One attempt to remove contaminants from the vicinity of the tape head includes using a removable cleaning cartridge that is periodically inserted into the tape drive. Unfortunately, using a separate cleaning cartridge is somewhat time consuming and can require specific scheduling by the user to perform such cleanings.

In light of the above, the need exists to provide a tape drive that protects the tape head from damage caused by contact with the buckle, tape leaders and the like. A further need exists to provide a tape drive that cleans the tape head without wasting undue time, and without relying on scheduling by the user to perform the cleaning operation.

SUMMARY

The present invention is directed to a tape drive and a shield assembly for a tape head of the tape drive. The tape drive is used with cartridges that include a storage tape and a cartridge leader. The tape drive includes a drive leader that engages the cartridge leader. The shield assembly includes a head shield that moves across the tape head at a shield wrap angle. The head shield selectively shields at least a portion of the tape head from the tape. Additionally, the shield wrap angle can be greater than a tape wrap angle of the storage tape.

In at least one embodiment, the head shield moves between a first position wherein the tape head is substantially exposed to the storage tape, and a second position wherein the tape head is substantially shielded from contact with the drive leader and the cartridge leader. Further, the head shield can include a shield aperture that substantially exposes the tape head when the head shield is in the first position. The shield assembly can also include a first shield mover that biases the head shield toward the first position, and a second shield mover that selectively biases the head shield toward the second position. The head shield can include a first shield surface that generally faces the storage tape, and a second shield surface that generally faces the tape head. In one embodiment, the second shield surface includes a cleaning region that is formed at least partially from a head cleaning material.

The present invention is also directed to a tape library, a method for protecting a tape head of a tape drive, and a method for cleaning a tape head of a tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
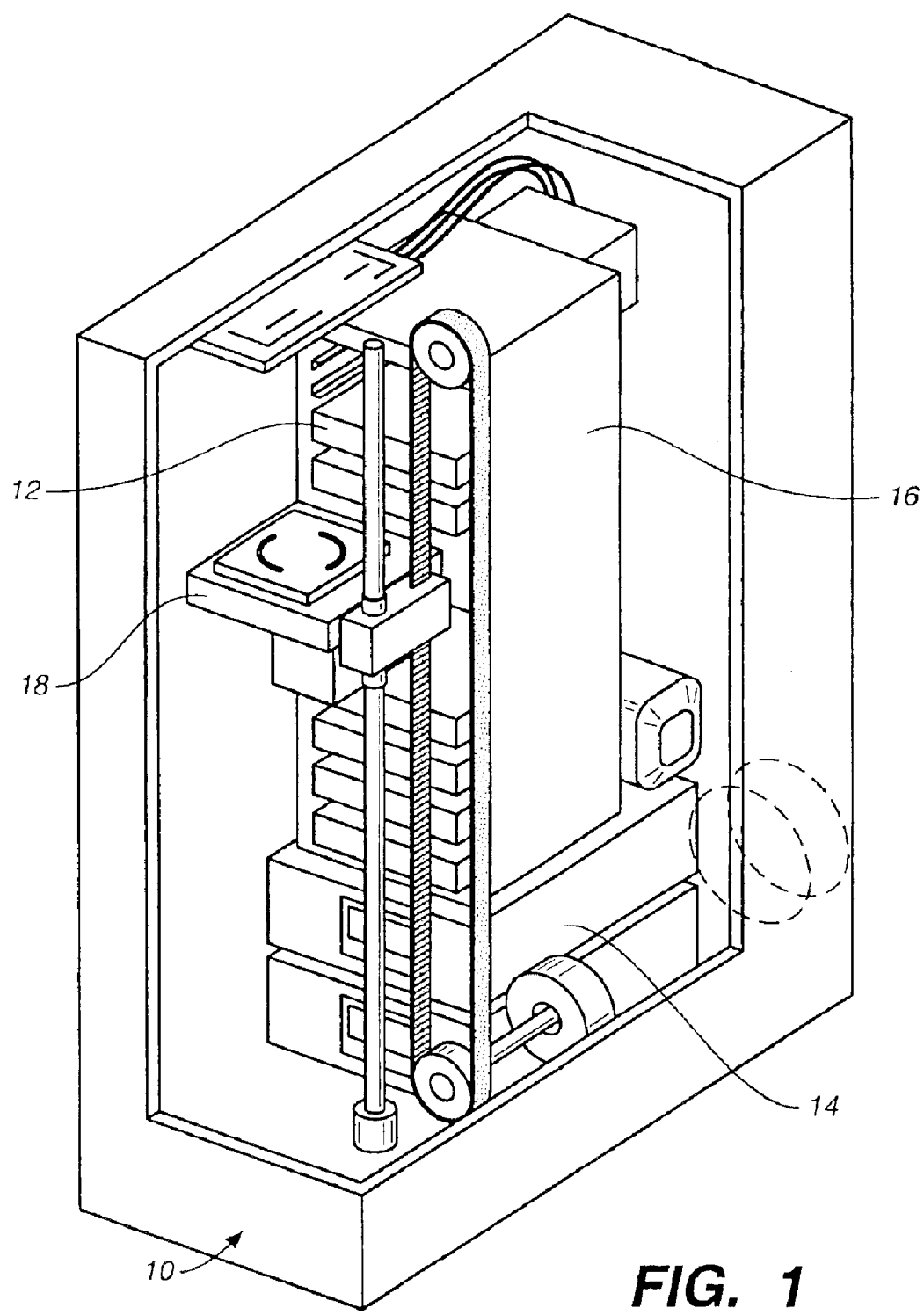
FIG. 1 is a perspective, partly cut-away view of tape library having features of the present invention.

FIG. 1 illustrates an embodiment of a tape library 10, which includes a plurality of cartridges 12 and one or more tape drives 14. The cartridges 12 are adapted to operate with the tape drive(s) 14 within the tape library 10. In the embodiment illustrated in FIG. 1, the tape library 10 also includes a cartridge magazine 16 and a robotic cartridge handler 18. The robotic cartridge handler 18 selectively retrieves one of the cartridges 12 from the cartridge magazine 16 and places the cartridge 12 within one of the tape drives 14. Alternatively, the tape drive 14 can be installed within a computer (not shown), a word processor (not shown), or another type of system. A detailed description of various components of the tape drive 14 is provided in U.S. Pat. No. 5,371,638, issued to Saliba, and assigned to Quantum Corporation, the Assignee of the present invention. The contents of U.S. Pat. No. 5,371,638 are incorporated herein by reference.

Figure 2:
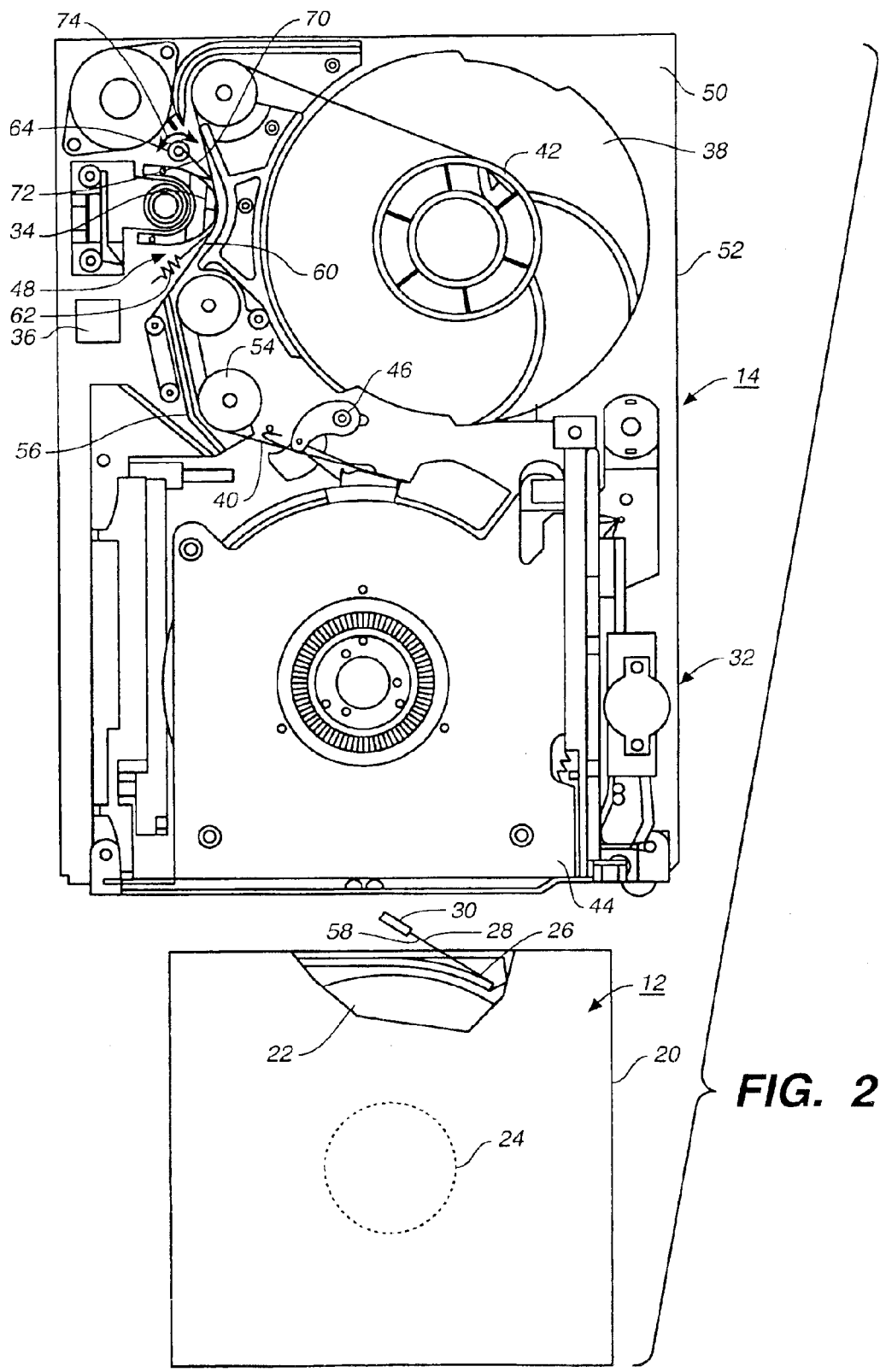
FIG. 2 is a top plan view of a cartridge and a tape drive having features of the present invention.

FIG. 2 illustrates one of the cartridges 12 and the tape drive 14 having features of the present invention. In FIG. 2, the cartridge 12 includes a cartridge housing 20, a cartridge reel 22 having a cartridge hub 24 (shown in phantom), a storage tape 26, and a cartridge leader 28 having a cartridge buckle component 30. The storage tape 26 is secured to the cartridge hub 24 on one end and the cartridge leader 28 on the other end. As illustrated in FIG. 2, the cartridge 12 includes a single cartridge reel 22. In an alternate embodiment (not shown), the cartridge can include two or more cartridge reels.

The tape drive 14 includes a drive housing 32, a tape head 34, a controller 36, a take-up reel 38 having a drive leader 40 and a take-up reel hub 42, a cartridge receiver 44, a buckler 46 and a shield assembly 48. The buckler 46 secures the drive leader 40 to the cartridge leader 28. The buckler 46 moves the drive leader 40 relative to the cartridge leader 28 to automatically buckle and/or unbuckle the drive leader 40 to the cartridge leader 28 in ways known to those skilled in the art.

The drive housing 32 retains the various components of the tape drive 14. The drive housing 32 illustrated in FIG. 2 includes a base 50, four spaced apart side walls 52 and a cover (not illustrated in FIG. 2 for clarity). The tape drive 14 further includes a plurality of tape rollers 54 and tape guides 56 which are coupled to the drive housing 32. The tape rollers 54 and tape guides 56 guide the storage tape 26 along a tape path past the tape head 34 and onto the take-up reel 38. In the present embodiment, the tape drive 14 includes three tape rollers 54 and two tape guides 56. However, the tape drive 14 can include a different number of tape rollers 54 and/or tape guides 56.

The storage tape 26 can magnetically store data in digital form. The storage tape 26 includes a storage surface 58 on one side of the storage tape 26 for storing data. The storage surface 58 is divided into a plurality of tracks (not shown). Each track can be a linear pattern which extends the length of the storage tape 26. Alternately, for example, the data can be recorded in diagonal strips or other geometric configurations across the storage tape 26. The storage tape 26 is initially retained on the cartridge reel 22 of the cartridge 12.

The controller 36 is in electrical communication with the tape head 34, and can direct electrical current to the tape head 34 for reading of data from and/or writing data to the storage tape 26. Further, the controller 36 can be utilized for controlling movement of the shield assembly 48, as explained below.

The shield assembly 48 selectively protects the tape head 34 from abrasions and other damage which can be caused by contact with components such as the drive leader 40 and/or the cartridge leader 28. The design of the shield assembly 48 can be varied to suit the design requirements of the tape drive 14 and the tape head 34. In the embodiment illustrated in FIG. 2, the shield assembly 48 includes a head shield 60, a first shield mover 62 and a second shield mover 64. One end of the head shield 60 is secured to the first shield mover 62, and the other end of the head shield 60 is secured to the second shield mover 64. The shield movers 62, 64 cooperate to selectively move the head shield 60 relative to the tape head 34. As set forth in greater detail below, the shield assembly 48 is positioned near the tape head 34. For example, in this embodiment, the first shield mover 62 is positioned on an opposite side of the tape head 34 from the second shield mover 64, with the head shield 60 being biased against the tape head 34 and spanning between the shield movers 62, 64. Importantly, either shield mover 62, 64 can be the first shield mover 62 or the second shield mover 64.

The design of the head shield 60, including the dimensions and the materials used to form the head shield 60 can be varied to suit the design requirements of the shield assembly 48 and the tape drive 14. In FIG. 2, the head shield 60 is flexible, flat, tape-shaped, and has a thickness that is greater than that of the storage tape 26. The head shield 60 can be formed at least in part from a film material or other suitable materials. For example, the thickness of the head shield 60 can be on the order of between approximately 1 mil and 10 mils, although thicknesses outside of this range can be used.

The head shield 60 includes a first shield surface 70 and an opposing second shield surface 72. The first shield surface 70 faces away from the tape head 34 and does not contact the tape head 34 during normal operation of the tape drive 14. Instead, the first shield surface 70 can contact other structures within the tape drive 14 during operation. For example, the first shield surface 70 can contact the storage tape 26, the drive leader 40 and/or the cartridge leader 28 during operation of the tape drive 14. The first shield surface 70 of the head shield 60 can be formed from a relatively smooth material having a comparatively low coefficient of friction to allow the structures that contact the first shield surface 70 to glide across the first shield surface 70. Various film materials such as plastics, and other suitable resins can be utilized to form the first shield surface 70, as non-exclusive examples.

The second shield surface 72 selectively contacts the tape head 34 during operation of the tape drive 14. Because the second shield surface 72 contacts the tape head 34, the second shield surface 72 can include different materials than the first shield surface 70 as provided herein. For example, the second shield surface 72 can contain carbon for ESD protection, or other conductive materials. Alternately, the second shield surface 72 can include one or more cleaning materials for cleaning the tape head 34, as discussed in greater detail below. Still alternatively, the second shield surface 72 can be substantially similar to the first shield surface 70, or can be formed from a material similar to the storage tape 26.

In this embodiment, the first shield mover 62 is coupled to the base of the drive housing 32. The first shield mover 62 biases the head shield 60 in a direction toward the first shield mover 62. The design of the first shield mover 62 can vary. For example, the first shield mover 62 illustrated in FIG. 2 includes a resilient member such as a constant force spring that maintains sufficient tension on the head shield 60 to keep the head shield 60 biased against the tape head 34.

However, other suitable structures can be utilized as the first shield mover 62.

Figure 5:
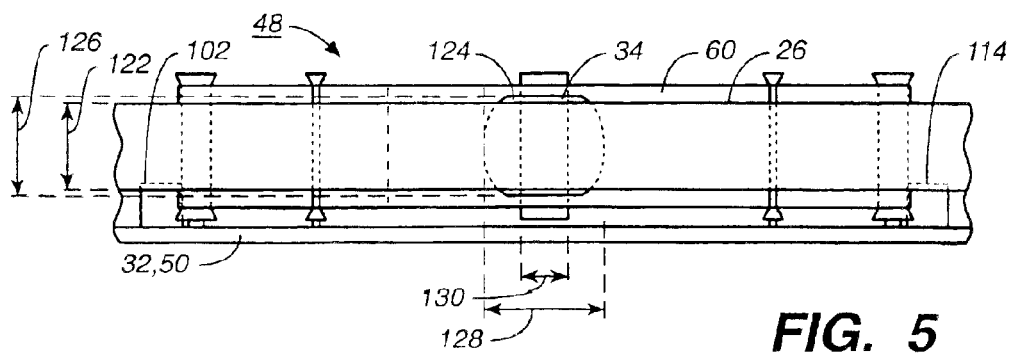
FIG. 5 is a side view of the cartridge and the tape drive illustrated in FIG. 4.

In the embodiment illustrated in FIG. 2, the second shield mover 64 is rotatably coupled to the base 50 of the drive housing 32. The controller 36 can electrically communicate with the second shield mover 64 to cause the second shield mover 64 to rotate in a clockwise or a counterclockwise direction (indicated by bi-directional arrow 74). In this embodiment, during loading and unloading of a cartridge 12 into the tape drive 14, the second shield mover 64 rotates in a counterclockwise direction which moves the head shield 60 toward the second shield mover 64, i.e. the second shield mover 64 opposes the bias of the first shield mover 62. With this design, the head shield 60 can move between a first position 75A wherein the tape head 34 is relatively unshielded and exposed to the storage tape 26 (as illustrated in FIG. 5), and a second position 75B or a third position 75C (illustrated in FIGS. 7 and 8, respectively) wherein the tape head 34 is substantially shielded from contact from various structures such as the storage tape 26, the drive leader 40 and/or the cartridge leader 28. Because the tape head 34 is shielded from these structures which cause electrostatic problems, electrostatic discharge to the tape head 34 is inhibited.

Further, rotation of the second shield mover 64 in the clockwise direction can be the result of the bias of the first shield mover 62 which moves the head shield 60 toward the first shield mover 62, e.g. the second shield mover 64 passively rotates in the clockwise direction. In an alternate embodiment, the second shield mover 64 can actively rotate in the clockwise direction.

During the process of loading one of the cartridges 12 into the tape drive 14, the cartridge leader 28 becomes fastened to the drive leader 40. The cartridge leader 28 and the drive leader 40 are then pulled in unison along the tape path, proximate the tape head 34, and onto the take-up reel. During unloading of the cartridge 12, the cartridge leader 28 and the drive leader 40 move in an opposite direction proximate the tape head 34. The cartridge leader 28 is then released from the drive leader 40, and the cartridge 12 is ejected from the tape drive 14. During passage of the cartridge leader 28 and the drive leader 40 across the tape head 34, the head shield 60 is positioned to protect the tape head 34 as set forth herein. The head shield 60 can also be utilized to protect the tape head 34 at other times, i.e. during transport of the tape drive 14, or during periods of non-use.

Figure 3:
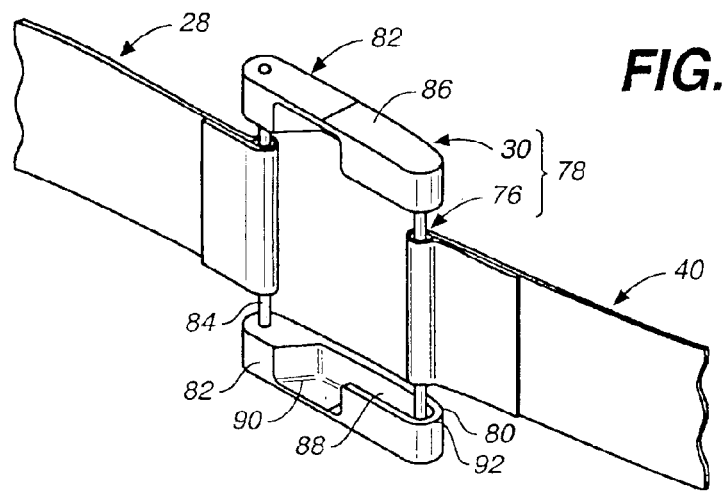
FIG. 3 is a perspective, partly cut-away view of a drive leader and a cartridge leader, including a buckle.

FIG. 3 illustrates one embodiment of the drive leader 40 and the cartridge leader 28. A proximal end of the drive leader 40 is secured to the take-up reel hub (illustrated in FIG. 2) of the take-up reel. The drive leader 40 includes a drive buckle component 76. The drive buckle component 76 and the cartridge buckle component 30 together form a buckle 78. A distal end of the drive leader 40 is bent around the drive buckle component 76 to secure the drive buckle component 76 to the drive leader 40. The drive leader 40 can include one layer of material, or can include multiple layers that are secured together. The material(s) utilized for each layers can be varied to suit the strength, flexibility and durability requirements of the drive leader 40. For example, each layer can be formed from polyethylene terephthalate ("PET"). Alternately, each of the layers could be made of another plastic, such as another type of polyester material. Still alternately, for example, each of the layers could be made from a woven material, or any other suitably strong material. Further, the cartridge leader 28 can be formed from similar materials to the drive leader 40.

In the embodiment illustrated in FIG. 3, the drive buckle component 76 includes a bar-shaped, buckle bar 80 which is secured to the drive leader 40. In the embodiment illustrated, the buckle bar 80 is a substantially straight piece of a rigid material, having a substantially circular cross section. The buckle bar 80 extends transversely across the drive leader 40.

The cartridge buckle component 30 includes a pair of spaced apart bar receivers 82 and a connector bar 84. Each bar receiver 82 is sized and shaped to receive a portion of drive buckle component 76 to couple the drive leader 40 to the cartridge leader 28. The use of two spaced apart bar receivers 82 ensures a reliable connection between the leaders 28, 40. In this embodiment, the bar receivers 82 are secured together with the connector bar 84, which is attached to the cartridge leader 28.

Each bar receiver 82 is defined by a substantially rectangular receiver housing 86. Each receiver housing 86 includes a channel 88 having a channel opening 90 and a channel end 92. During coupling, the buckle bar 80 is inserted into the channel opening 90. Subsequently, the buckle bar 80 is forced to slide in the channel 88 until the buckle bar 80 reaches the channel end 92.

The foregoing example of the drive leader 40 and the cartridge leader 28, which together include a buckle 78, is for illustrative purposes, and is not intended to limit the scope of the present invention in any manner. A detailed description and a number of alternate embodiments of the buckle 78 are illustrated and described in U.S. Pat. Nos. 6,092,754 and 6,311,915 issued to Rathweg, et al., and assigned to Quantum Corporation. Additionally, the drive leader 40 and the cartridge leader 28 may be buckled using other suitable designs such as those described in U.S. Pat. Nos. 4,662,049 and 4,720,913 issued to Hertrich, as non-exclusive examples. Each such embodiment and other suitable embodiments can be utilized with the present invention. The contents of U.S. Pat. Nos. 6,092,754, 6,311,915, 4,662,049 and 4,720,913 are incorporated herein by reference.

Figure 4:
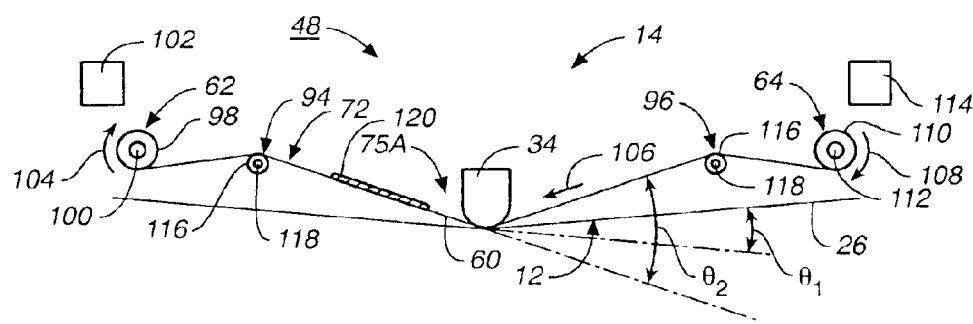
FIG. 4 is a top plan view of a portion of a cartridge and a portion of a tape drive including a shield assembly in a first position, having features of the present invention.

FIG. 4 illustrates a top view of a portion of the storage tape 26 and an embodiment of the shield assembly 48 in relation to the tape head 34. During operation of the tape drive in conjunction with the cartridge, the tape path of the storage tape 26 has a tape wrap angle $\theta_1$. The specific tape wrap angle $\theta_1$ can be varied depending upon the requirements of the particular tape drive. The tape wrap angle $\theta_1$ is determined by the positioning of the tape rollers 54 (illustrated in FIG. 2) relative to the tape head 34. For example, a typical tape wrap angle $\theta_1$ can be approximately 6 degrees. Alternatively, the tape wrap angle $\theta_1$ can be greater or less than 6 degrees.

In this embodiment, the shield assembly 48 includes the head shield 60, the first shield mover 62, the second shield mover 64, a first shield positioner 94 and a second shield positioner 96. The shield movers 62, 64 move the head shield 60 relative to the tape head 34. The design of the shield movers 62, 64 can vary. In the embodiment illustrated in FIG. 4, the first shield mover 62 includes a first spool 98 and a first mover shaft 100. The first spool 98 is mounted onto the first mover shaft 100, which is secured to the drive housing 32 (illustrated in FIG. 5). Further, the first shield mover 62 can include a first motor 102 that selectively rotates the first shield mover 62 in either a clockwise or a counterclockwise direction. It is recognized that the first motor 102 can be any suitable motor that causes controlled rotation of the first shield mover 62 about the first mover shaft 100. For example, the first motor 102 can include magnetic, electromagnetic, voice coil, or any other mechanical or electrical type of motor. In FIG. 4, the first shield mover 62 is shown rotated in a clockwise direction (indicated by arrow 104), which biases the head shield toward the first shield mover (as indicated by arrow 106).

As a consequence of the clockwise rotation of the first shield mover 62, the second shield mover 64 similarly rotates in a clockwise direction (indicated by arrow 108). In this example, the movement of the second shield mover 64 can be passive, e.g. caused by rotation of the first shield mover 62, or active, e.g. caused by affirmative clockwise rotation of the second shield mover 64.

In this embodiment, the second shield mover 64 includes a second spool 110 and a second mover shaft 112. The second spool 110 is mounted onto the second mover shaft 112, which is secured to the drive housing 32 (illustrated in FIG. 5). Further, the second shield mover 64 can include a second motor 114 that selectively rotates the second shield mover 64 in either a clockwise or a counterclockwise direction. Similar to the first motor 102, it is recognized that the second motor 114 can be any suitable motor that causes controlled rotation of the second shield mover 64 about the second mover shaft 112.

The shield positioners 94, 96 bias the head shield 60 against the tape head 34. The design, number and positioning of the shield positioners 94, 96 can vary. In the embodiment illustrated in FIG. 4, the shield assembly 48 includes two shield positioners 94, 96. The first shield positioner 94 is positioned substantially between the first shield mover 62 and the tape head 34, and the second shield positioner 96 is positioned substantially between the second shield mover 64 and the tape head 34. Alternatively, the shield positioners 94, 96 can be located in other areas of the tape drive provided that the head shield 60 is sufficiently biased against the tape head 34.

The shield positioners 94, 96 can each include a positioner spool 116 and a positioner shaft 118. In this embodiment, the positioner spools 116 are rotatably mounted on the positioner shafts 118. Alternate configurations can be utilized with the present invention. For example, the shield positioners 94, 96 can be immovably mounted to the drive housing 32. In another embodiment, the shield positioners 94, 96 are coupled to positioner motors (not shown) that actively rotate the shield positioners 94, 96 depending upon the direction of movement of the head shield 60. In still another embodiment, the shield positioners 94, 96 are not coupled to positioner motors, and passively bias the head shield 60 against the tape head 34.

Because of the positioning of the shield movers 62, 64 and the shield positioners 94, 96 as illustrated in FIG. 4, the head shield 60 has a shield wrap angle $\theta_2$ that is greater than the tape wrap angle $\theta_1$. For example, the shield wrap angle $\theta_2$ can be at least approximately 2 percent greater than the tape wrap angle $\theta_2$. In alternate embodiments, the shield wrap angle $\theta_2$ is at least approximately 5 percent, 25 percent, 50 percent, 100 percent, 200 percent, 300 percent, 500 percent or 1,000 percent greater than the tape wrap angle $\theta_1$. Alternatively, the shield wrap angle $\theta_2$ can be greater than 1,000 percent. With this design, the shield assembly 48 does not interfere with operation of the tape drive 14 during reading from or writing to the storage tape 26. Stated another way, when the shield assembly 48 is in the first position 75A, the head shield 60 does not contact the storage tape 26, and allows the storage tape 26 to contact the tape head 34 for read and write operations of the tape drive 14.

In addition, at least a portion of the second shield surface 72 can include a cleaning region 120 that cleans the tape head 34 during contact between the second shield surface 72 and the tape head 34. More specifically, the second shield surface 72 can include a cleaning material that is utilized to remove dirt, dust, particulates and other contaminants from the tape head 34. For example, such material can include nylon or other plastic materials. However, any suitable cleaning material can be utilized to form at least a portion of the second shield surface 72. The length of the head shield 60 that includes the cleaning region 120 can be varied.

FIG. 5 illustrates a side view of the tape head 34, the storage tape 26 and the shield assembly 48 in the first position 75A. The storage tape 26 has a tape width 122 that can vary from cartridge to cartridge 12 (illustrated in FIG. 2). In one embodiment, the tape width 122 can be at least approximately one-half an inch. Alternately, for example, the storage tape 26 can have a tape width 122 of less than one-half inch.

In this embodiment, the head shield 60 includes a shield aperture 124, which is shown proximate the tape head 34. The geometry of the shield aperture 124 can vary. In the embodiment illustrated in FIG. 5, the shield aperture 124 is somewhat oval shaped. The shield aperture 124 has an aperture width 126 that is greater than the tape width 122 of the storage tape 26. This allows substantially the entire width of the storage tape 26 to contact the tape head 34. In various embodiments, the aperture width 126 is at least approximately 10 percent, 25 percent, 50 percent, 100 percent, 200 percent, 300 percent, 500 percent or 1,000 percent greater than the tape width 122.

Additionally, the shield aperture 124 has a minimum aperture length 128 that is greater than a maximum width 130 of the tape head 34. In various embodiments, the minimum aperture length 128 is at least approximately 10 percent, 25 percent, 50 percent, 75 percent, 100 percent, 200 percent or 300 percent greater than the maximum width 130 of the tape head 34.

Importantly, although the head shield 60 is substantially parallel to the tape path as illustrated in FIG. 5, in alternative embodiments the head shield 60 can be perpendicular or diagonal to the tape path.

Figure 6:
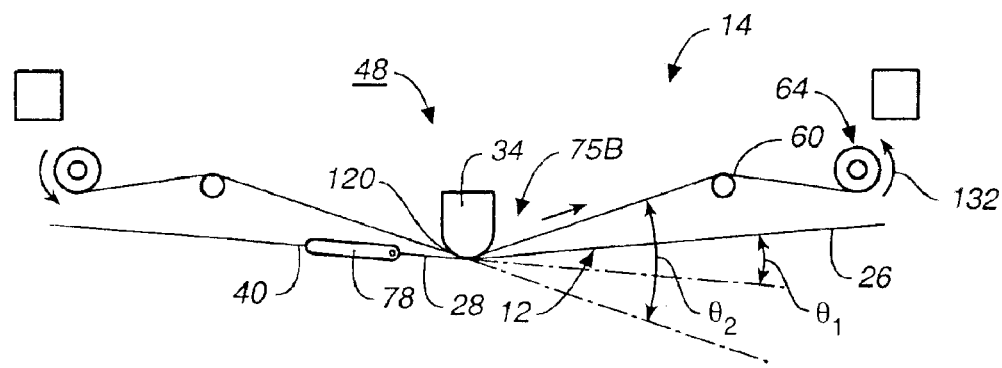
FIG. 6 is a top plan view of a portion of the cartridge, and the tape drive including the shield assembly in a second position.

FIG. 6 illustrates a top view of a portion of the storage tape 26 and the shield assembly 48 in the second position relative to the tape head 34. The head shield 60 is moved into the second position when potential contact between the tape head 34 and the drive leader 40, the cartridge leader 28 and/or the buckle 78 occurs. In the second position, the second shield mover 64 has rotated in a counterclockwise direction (indicated by arrow 132) to move the head shield 60 toward the second shield mover 64. Moreover, in the second position, the cleaning region 120 can contact the tape head 34 in order to clean the tape head 34 of contaminants and debris. Additionally, FIG. 6 illustrates that the shield wrap angle $\theta_2$ is greater than the tape wrap angle $\theta_1$.

Figure 7:
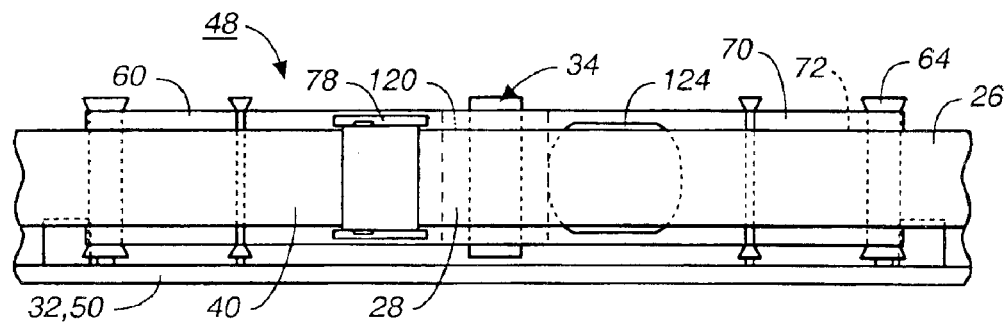
FIG. 7 is a side view of the cartridge and the tape drive illustrated in FIG. 6.

FIG. 7 illustrates a side view of the tape head 34, the storage tape 26 and the shield assembly 48 in the second position. As illustrated in FIG. 7, the shield aperture 124 has moved toward the second shield mover 64, away from the tape head 34. The tape head 34 is therefore shielded from the storage tape 26, the drive leader 40 and the cartridge leader 28, and thus, the buckle 78. Stated another way, the head shield 60 was moved directly between the tape head 34 and the structures attached to the storage tape 26, i.e. the drive leader 40, the cartridge leader 28 and the buckle 78. In the second position, the first shield surface 70 of the head shield 60 contacts the potentially damaging structures such as the drive leader 40, the cartridge leader 28 and the buckle 78, when such structures pass proximate the tape head 34. With this design, the head shield 60 substantially protects the tape head 34 from abrasions and/or other damage that can be caused by contact with such structures during loading and unloading of the cartridge from the tape drive.

As previously provided herein, at least a portion of the second shield surface 72 can include the cleaning region 120 that can remove dirt, dust, particulates and other contaminants from the tape head 34. For example, the second shield surface 72 adjacent to the shield aperture 124 can include the cleaning region 120. Therefore, when the head shield 60 moves from the first position 75A (illustrated in FIG. 4) to the second position 75B (illustrated in FIG. 6), the tape head 34 can be effectively cleaned. The cleaning region 120 can form the entire second shield surface 72, or on just a portion of the second shield surface 72.

Figure 8:
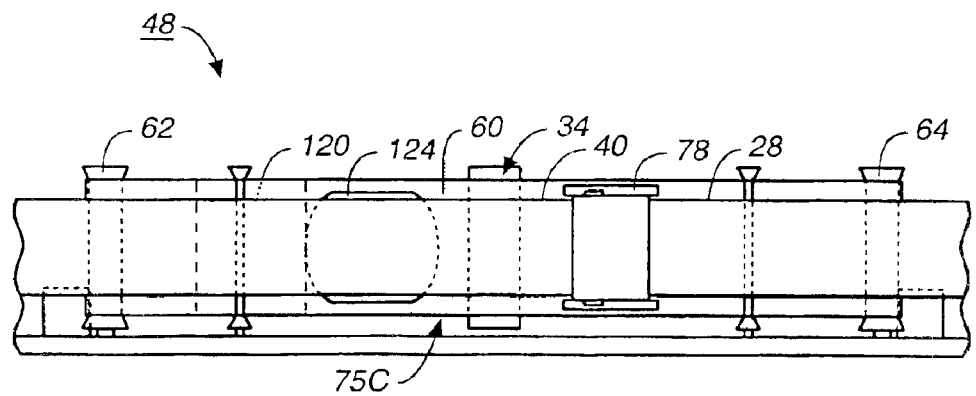
FIG. 8 is a side view of the cartridge and the tape drive illustrated in FIG. 6, with the shield assembly in a third position.

FIG. 8 illustrates an alternate positioning of the head shield 60, which has moved to the third position 75C. In the third position 75C, instead of the second shield mover 64 moving the head shield 60 toward the second shield mover 64, the first shield mover 62 biases the head shield 60 toward the first shield mover 62. However, rather than the shield aperture 124 becoming positioned proximate the tape head 34, the head shield 60 is moved further toward the first shield mover 62 so that the shield aperture 124 moves to an opposite side of the tape head 34 from that illustrated in FIG. 7. With this design, the shield assembly 48 protects the tape head 34 from contact with the drive leader 40, the cartridge leader 28 and/or the buckle 78, but does not perform the additional function of cleaning the tape head 34.

Further, the cleaning region 120 (illustrated in phantom) can be positioned on only one side of the shield aperture 124. With this design, the controller (illustrated in FIG. 2) of the tape drive can determine if a cleaning of the tape head 34 is necessary, and can activate movement of the first shield mover 62 or the second shield mover 64 to move the head shield 60 in the appropriate direction, i.e. toward the first shield mover 62 or toward the second shield mover 64. For example, if the tape drive determines that a cleaning is required, the head shield 60 can be moved to the second position during loading and/or unloading of the cartridge from the tape drive. If, however, a cleaning is not required, the head shield 60 can be moved to the third position 75C during loading and/or unloading of the cartridge.

The necessity for cleaning of the tape head 34 can be determined by a counting mechanism (not shown), e.g. the tape drive can require a cleaning after a particular number of load/unload cycles which is programmed into the firmware of the tape drive, by a sensor (not shown) within the tape drive, manually by the user, or by another suitable method.

While the particular tape drive 14 and shield assembly 48 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A shield assembly for a tape drive that receives a cartridge having a storage tape, the tape drive including a drive housing and a tape head, the storage tape moving proximate the tape head at a tape wrap angle during operation of the tape drive, the shield assembly comprising:

a head shield that is coupled to the drive housing, the head shield being positioned relative to the tape head at a shield wrap angle that is greater than the tape wrap angle, the head shield selectively shielding at least a portion of the tape head from the storage tape.

2. The shield assembly of claim 1 wherein the head shield moves between a first position wherein the tape head is substantially exposed to the storage tape, and a second position wherein the tape head is substantially shielded from the storage tape.

3. The shield assembly of claim 2 wherein the head shield includes a shield aperture that substantially exposes the tape head when the head shield is in the first position.

4. The shield assembly claim 2 further comprising a first shield mover that biases the head shield toward the first position.

5. The shield assembly of claim 4 wherein the first shield mover includes a spring.

6. The shield assembly of claim 4 wherein a second shield mover selectively biases the head shield toward the second position.

7. The shield assembly of claim 6 wherein the second shield mover selectively overcomes the bias of the first shield mover to move the head shield to the second position.

8. A tape drive including a tape head and the head shield of claim 6, wherein the cartridge includes a cartridge leader that moves along the tape path, the tape drive further comprising a drive leader that moves along the tape path, and a controller that selectively controls the second shield mover to move the head shield to the second position to shield the tape head from contact with one of the cartridge leader and the drive leader.

9. The shield assembly of claim 1 wherein the head shield is formed at least partially from a film material.

10. The shield assembly of claim 1 wherein the head shield includes a first shield surface that generally faces the storage tape, and a second shield surface that generally faces the tape head, the second shield surface including a head cleaning material.

11. A tape drive including a tape head and the shield assembly of claim 1.

12. The tape drive of claim 11 wherein the shield assembly includes (i) a first shield mover coupled to a first shaft, and (ii) a second shield mover secured to a point that is remote from the first shaft, and wherein the head shield has a first end secured to the first shield mover and a second end secured to the second shield mover.

13. The tape drive of claim 12 wherein the tape head is positioned substantially between the first shield mover and the second shield mover.

14. The tape drive of claim 11 further comprising a tape guide that biases the storage tape toward the tape head, and wherein the shield assembly includes a shield positioner that biases the head shield against the tape head, the shield positioner being remotely positioned from the tape guide.

15. A method for cleaning a tape head of a tape drive, the tape drive moving a storage tape across the tape head at a tape wrap angle, the method comprising the steps of:

providing a head shield that moves across the tape head, the head shield having a shield wrap angle that is greater than the tape wrap angle; and positioning a head cleaning region on the head shield that cleans the tape head when the head shield moves across the tape head.

16. The method of claim 15 wherein the step of providing a head shield includes providing a head shield having a shield aperture that substantially exposes the tape head to the storage tape when the shield aperture is positioned adjacent to the tape head.

17. The method of claim 16 further comprising the step of selectively moving the head shield relative to the tape head between a first position wherein the shield aperture is adjacent to the tape head and a second position wherein the shield aperture is not adjacent to the tape head so that the head shield is shielding the tape head.

18. A tape drive adapted for use with a cartridge having a storage tape that moves along a tape path, the tape drive comprising:
   a drive housing;
   a tape head coupled to the drive housing; and
   a shield assembly including (i) a first shield mover coupled to a first shaft, (ii) a second shield mover secured to a location that is remote from the first shaft, and (iii) a head shield positioned at least partially between the tape head and the tape path, the head shield having a first end secured to the first shield mover and a second end secured to the second shield mover, at least one of the shield movers moving the head shield between a first position that allows contact between the tape head and the storage tape and a second position that shields at least a portion of the tape head from the storage tape.

19. The tape drive of claim 18 wherein the cartridge includes a cartridge leader that moves along the tape path, and wherein the tape drive further comprises (i) a drive leader that moves along the tape path and couples with the cartridge leader, and (ii) a controller that selectively controls at least one of the movers to move the head shield from the first position to the second position to shield the tape head from contact with one of the cartridge leader and the drive leader.

20. The tape drive of claim 18 wherein the storage tape moves proximate the tape head at a tape wrap angle during operation of the tape drive, and wherein the head shield is positioned relative to the tape head at a shield wrap angle that is greater than the tape wrap angle.

21. The tape drive claim 18 wherein the first shield mover biases the head shield toward the first position.

22. The tape drive of claim 21 wherein the first shield mover includes a spring.

23. The tape drive of claim 21 wherein the second shield mover selectively overcomes the bias of the first shield mover to move the head shield toward the second position.

24. The tape drive of claim 18 wherein the head shield includes a first shield surface that generally faces the storage tape, and a second shield surface that generally faces the tape head, the second shield surface including a head cleaning material.

25. The tape drive of claim 18 wherein the tape head is positioned substantially between the first shield mover and the second shield mover.

26. The tape drive of claim 18 further comprising a tape guide that biases the storage tape toward the tape head, and wherein the shield assembly includes a shield positioner that biases the head shield against the tape head, the shield positioner being remotely positioned from the tape guide.

27. A tape drive adapted for use with a cartridge having a storage tape and a cartridge leader that move along a tape path, the tape drive comprising:
   a drive leader that is adapted to couple with the cartridge leader;
   a drive housing;
   a tape head coupled to the drive housing;
   a head shield positioned at least partially between the tape head and the tape path;
   a mover assembly that moves the head shield between a first position that allows contact between the tape head and one of the storage tape, the cartridge leader and the drive leader, and a second position that shields at least a portion of the tape head from one of the cartridge leader and the drive leader; and
   a controller that selectively controls the mover assembly to move the head shield from the first position to the second position to shield the tape head from contact with one of the cartridge leader and the drive leader.

28. The tape drive of claim 27 wherein the controller controls the mover to move the head shield toward the second position during loading of the cartridge into the tape drive.

29. The tape drive of claim 27 wherein the mover assembly includes a first shield mover coupled to a first shaft and a second shield mover secured to a point that is remote from the first shaft, and wherein the head shield has a first end secured to the first shield mover and a second end secured to the second shield mover.

30. The tape drive of claim 29 wherein the tape head is positioned substantially between the first shield mover and the second shield mover.

31. The tape drive of claim 29 wherein at least one of the shield movers moves the head shield from the second position to the first position in a direction that is opposite from movement of the head shield from the first position to the second position.

32. The tape drive of claim 27 wherein the storage tape moves proximate the tape head at a tape wrap angle during operation of the tape drive, and wherein the head shield is positioned at a shield wrap angle relative to the tape head that is greater than the tape wrap angle.

33. The tape drive claim 32 wherein the mover assembly includes a first shield mover and a second shield mover, the first shield mover biasing the head shield toward the first position.

34. The tape drive of claim 33 wherein the first shield mover includes a spring.

35. The tape drive of claim 33 wherein the second shield mover selectively overcomes the bias of the first shield mover to move the head shield toward the second position.

36. The tape drive of claim 27 wherein the head shield includes a first shield surface that generally faces the storage tape, and a second shield surface that generally faces the tape head, the second shield surface including a head cleaning material.

37. The tape drive of claim 27 further comprising a tape guide that biases the storage tape toward the tape head, and a shield positioner that biases the head shield against the tape head, the shield positioner being remotely positioned from the tape guide.

38. A tape drive adapted for use with a cartridge having a storage tape that moves along a tape path, the tape drive comprising:
   a drive housing;
   a tape head coupled to the drive housing, wherein the storage tape moves proximate the tape head at a tape wrap angle during operation of the tape drive; and
   a shield assembly including (i) a first shield mover coupled to a first shaft, (ii) a second shield mover secured to a location that is remote from the first shaft, the shield movers being positioned so that the tape head is positioned substantially between the first shield mover and the second shield mover, and (iii) a head shield that is coupled to the drive housing, the head shield being positioned at least partially between the tape head and the tape path, the head shield being positioned relative to the tape head at a shield wrap angle that is greater than the tape wrap angle, the head shield having a first end secured to the first shield mover and a second end secured to the second shield mover, at least one of the shield movers moving the head shield between a first position that allows contact between the tape head and the storage tape and a second position that shields at least a portion of the tape head from the storage tape, the head shield selectively shielding at least a portion of the tape head from the storage tape;

wherein the first shield mover biases the head shield toward the first position and wherein the second shield mover selectively overcomes the bias of the first shield mover to move the head shield toward the second position.

* * * * *